A. C. CARLISLE.
COMBINED HAND ANVIL AND SET GAGE.
APPLICATION FILED MAR. 13, 1918.
1,299,297. Patented Apr. 1, 1919.
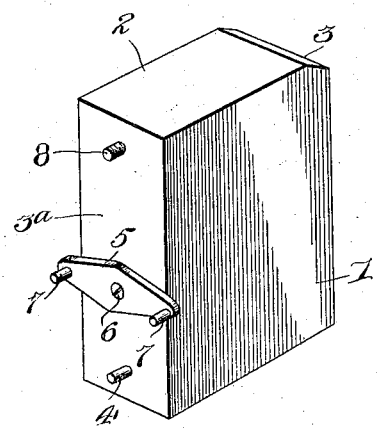
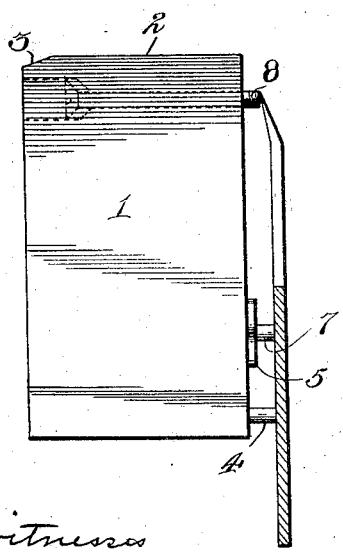
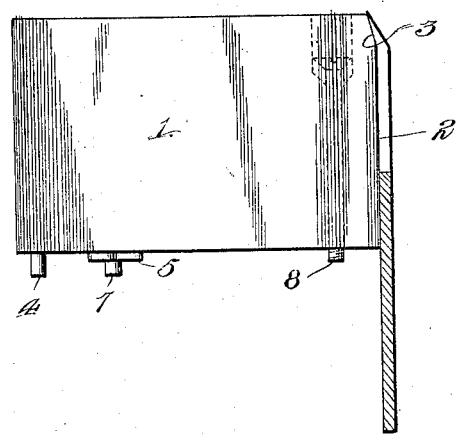
Inventor.
Alfred C. Carlisle

UNITED STATES PATENT OFFICE.

ALFRED C. CARLISLE, OF LAKESIDE, OHIO.

COMBINED HAND-ANVIL AND SET-GAGE.

1,299,297.  Specification of Letters Patent.  Patented Apr. 1, 1919.

Application filed March 13, 1918. Serial No. 222,068.

*To all whom it may concern:*

Be it known that I, ALFRED C. CARLISLE, a citizen of the United States, residing at Lakeside, in the county of Ottawa and State of Ohio, have invented a new and useful Combined Hand-Anvil and Set-Gage, of which the following is a specification.

This invention is a "combined hand anvil and set gage" for use in setting the teeth of saws, the object of the invention being to provide an improved tool of this character which is adapted to be used both for setting the teeth and for gaging the setting of the teeth, a further object being to provide an improved tool of this character which is cheap and simple, which may be adjusted according to the desired set or inclination of the teeth, and which is easily operated and is not likely to get out of order.

The invention consists in the construction, combination and arrangement of devices hereinafter described and claimed.

In the accompanying drawings:—

Figure 1 is a perspective view of a combined hand anvil and set gage constructed in accordance with my invention.

Fig. 2 is an elevation of the same arranged in operative relation to a saw for setting the teeth of the saw.

Fig. 3 is a similar view showing the tool arranged for use in gaging the set of the teeth on a saw.

In the embodiment of my invention I provide an anvil body 1 which is here shown as of oblong rectangular form, and which has at one end a plane face 2 to bear against one side of the saw and a bevel 3 for arrangement opposite the points of the saw teeth and to enable the saw teeth to be set as desired by striking them with a hammer, on the side opposite the bevel. The anvil is held and moved as required by one hand and the hammer is wielded by the other. On one side or face 3ª of the anvil body, near one end thereof, is a fixed stud 4. An arm 5 is also arranged on said side or face of the body and is pivotally mounted thereon as by means of a screw 6, which is arranged at the center of the arm and adapts the latter to be turned either parallel with or transversely to the face 3ª. The arm is provided at its ends with studs 7. The anvil body is also provided near the end opposite the stud 4 with an adjustable gage set 8 which is here shown as a screw that extends through and engages a threaded opening transversely of the body. The adjusting gage screw is here shown as having a kerf line in its head for engagement by a screw driver to enable said gage screw to be adjusted as desired.

To use the device as a set gage the arm 5 is turned at right angles to the body and the gage is then held so as to cause its studs 4, 7 to bear against one side of the saw blade and with the adjustable screw stud opposite meets or engages the said tooth which has been set. If the said adjustable stud meets or engages the said tooth while the studs 4 and 7 are all squarely engaged with the saw blade the set or inclination of the tooth is correct. If there is a space between the tooth and the adjustable stud the tooth needs to be inclined or set to a greater extent. If the intermediate studs 7 do not squarely bear against the blade and the tool will wabble, the set or inclination of the tooth is too great, and this must be corrected.

Having thus described my invention I claim:—

A a tool of the class described comprising a body having gage studs on one side near the opposite ends, a pivotally mounted arm on the same side at a point between said gage studs, and gage studs on the ends of said pivotally mounted arm.

In testimony whereof I affix my signature in presence of two witnesses.

ALFRED C. CARLISLE.

Witnesses:
W. T. BRAITHWAITE,
N. D. McLAUGHLIN.

Copies of this patent may be obtained for five cents each, by addressing the "Commissioner of Patents, Washington, D. C."